(12) United States Patent
Wischmeyer

(10) Patent No.: US 9,114,887 B2
(45) Date of Patent: Aug. 25, 2015

(54) METHODS AND SYSTEMS FOR DISPLAYING AIRCRAFT INFORMATION

(71) Applicant: Gulfstream Aerospace Corporation, Savannah, GA (US)

(72) Inventor: Carl Edward Wischmeyer, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 14/068,548

(22) Filed: Oct. 31, 2013

(65) Prior Publication Data
US 2015/0120090 A1 Apr. 30, 2015

(51) Int. Cl.
*G01C 23/00* (2006.01)
*B64D 45/00* (2006.01)

(52) U.S. Cl.
CPC ....................... *B64D 45/00* (2013.01)

(58) Field of Classification Search
USPC ............................................................ 701/3
See application file for complete search history.

(56) References Cited

U.S. PATENT DOCUMENTS

| | | |
|---|---|---|
| 2,718,628 A | 9/1955 | Bartlett et al. |
| 3,713,090 A | 1/1973 | Dickinson |
| 4,970,683 A | 11/1990 | Harshaw et al. |
| 5,016,147 A | 5/1991 | Voorhees |
| 5,019,961 A | 5/1991 | Addesso et al. |
| 5,270,931 A | 12/1993 | Appleford |
| 5,444,837 A | 8/1995 | Bomans et al. |
| 5,454,074 A | 9/1995 | Hartel et al. |
| 5,475,594 A | 12/1995 | Oder et al. |
| 5,522,026 A | 5/1996 | Records et al. |
| 6,057,786 A | 5/2000 | Briffe et al. |
| 6,262,720 B1 | 7/2001 | Jeffrey et al. |
| 7,580,235 B2 * | 8/2009 | Hamasaki et al. ............. 361/115 |
| 8,190,305 B1 * | 5/2012 | Prince et al. ...................... 701/3 |
| 2004/0145612 A1 * | 7/2004 | Kopitzke et al. ............. 345/810 |
| 2005/0270150 A1 * | 12/2005 | Freiling et al. .............. 340/521 |
| 2006/0108873 A1 * | 5/2006 | Hamasaki et al. ........... 307/10.1 |
| 2008/0184166 A1 * | 7/2008 | Getson et al. ................ 715/810 |
| 2010/0083668 A1 * | 4/2010 | Foster et al. .................... 60/801 |
| 2012/0041639 A1 * | 2/2012 | Followell et al. ........... 701/34.3 |
| 2012/0242591 A1 * | 9/2012 | Kawalkar ..................... 345/173 |
| 2012/0260180 A1 * | 10/2012 | Herzberg et al. ............. 715/736 |
| 2013/0133306 A1 * | 5/2013 | Qiu et al. ................... 60/39.091 |
| 2013/0321192 A1 * | 12/2013 | Starr et al. ..................... 342/29 |
| 2014/0156166 A1 * | 6/2014 | Moeckly et al. ............. 701/102 |

* cited by examiner

*Primary Examiner* — Hussein A. Elchanti
(74) *Attorney, Agent, or Firm* — Ingrassia, Fisher & Lorenz, P.C.

(57) ABSTRACT

A method and an instrumentation system for an aircraft are provided. The method of presenting aircraft information includes activating a master indicator in response to a trigger event associated with operation of the aircraft, receiving a user input associated with the master indicator, and displaying information associated with the trigger event in response to receiving the user input associated with the master indicator. The instrumentation system performs the operations of the method.

20 Claims, 3 Drawing Sheets

METHODS AND SYSTEMS FOR DISPLAYING AIRCRAFT INFORMATION

TECHNICAL FIELD

The technical field relates generally to aircraft instrumentation and control, and more particularly relates to aircraft instrumentation that presents checklists and synoptics in response to inputs based on a master indicator.

BACKGROUND

As modern aviation advances, the demand for ever-increasing flight envelopes and pilot performance grows. To help meet this demand on the aircraft and on the pilots, modern aircraft include impressive arrays of displays, instruments, and sensors designed to provide the pilot with menus, data, and graphical options intended to enhance pilot performance and overall safety of the aircraft and the passengers.

Typical aviation instrumentation includes multiple warning and caution lights that are associated with various systems of the aircraft. A warning light indicates that the system associated with the warning light is in critical condition and requires immediate attention, such as when a component has failed. A caution light indicates that the system associated with the caution light requires attention, but is not in critical condition. The warning lights may be differentiated by color, with warning lights often having a red color and caution lights often having an amber or orange color.

The warning and caution lights are typically associated with paper-based checklists that are to be followed by the pilot or other crew member when a warning light or a caution light illuminates. These checklists often require the pilot or other crew to analyze multiple components and/or systems before proceeding. The paper based checklists are adequate for their intended purpose, but the need for improved response times when finding and following the checklists is ever present.

As such, it is desirable to present a checklist and related information to an operator of a vehicle which will reduce the time and effort needed to perform the tasks of the checklist. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of a method and an aircraft instrumentation system are disclosed herein.

In a first non-limiting embodiment, the method of presenting vehicle information includes, but is not limited to, activating a master indicator in response to a trigger event associated with operation of the aircraft, receiving a user input associated with the master indicator, and displaying information associated with the trigger event in response to receiving the user input associated with the master indicator.

In a second non-limiting embodiment, the instrumentation system includes, but is not limited to, a plurality of aircraft components that are associated with operating the aircraft, a master indicator for indicating the status of any aircraft component of the plurality of aircraft components, and a controller electronically coupled with the plurality of aircraft components and the master status indicator. The controller is configured for activating the master status indicator in response to a trigger event associated with any aircraft component of the plurality of aircraft components, receiving a user input associated with the master status indicator, and displaying information associated with the trigger event in response to receiving the user input associated with the master status indicator.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

The following detailed description is merely exemplary in nature and is not intended to limit application and uses. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computer system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the block diagrams shown herein depict example arrangements of elements, additional intervening elements, devices, features, or components may be present in an actual embodiment.

Finally, for the sake of brevity, conventional techniques and components related to computer systems and other functional aspects of a computer system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the disclosure.

Figure 1:
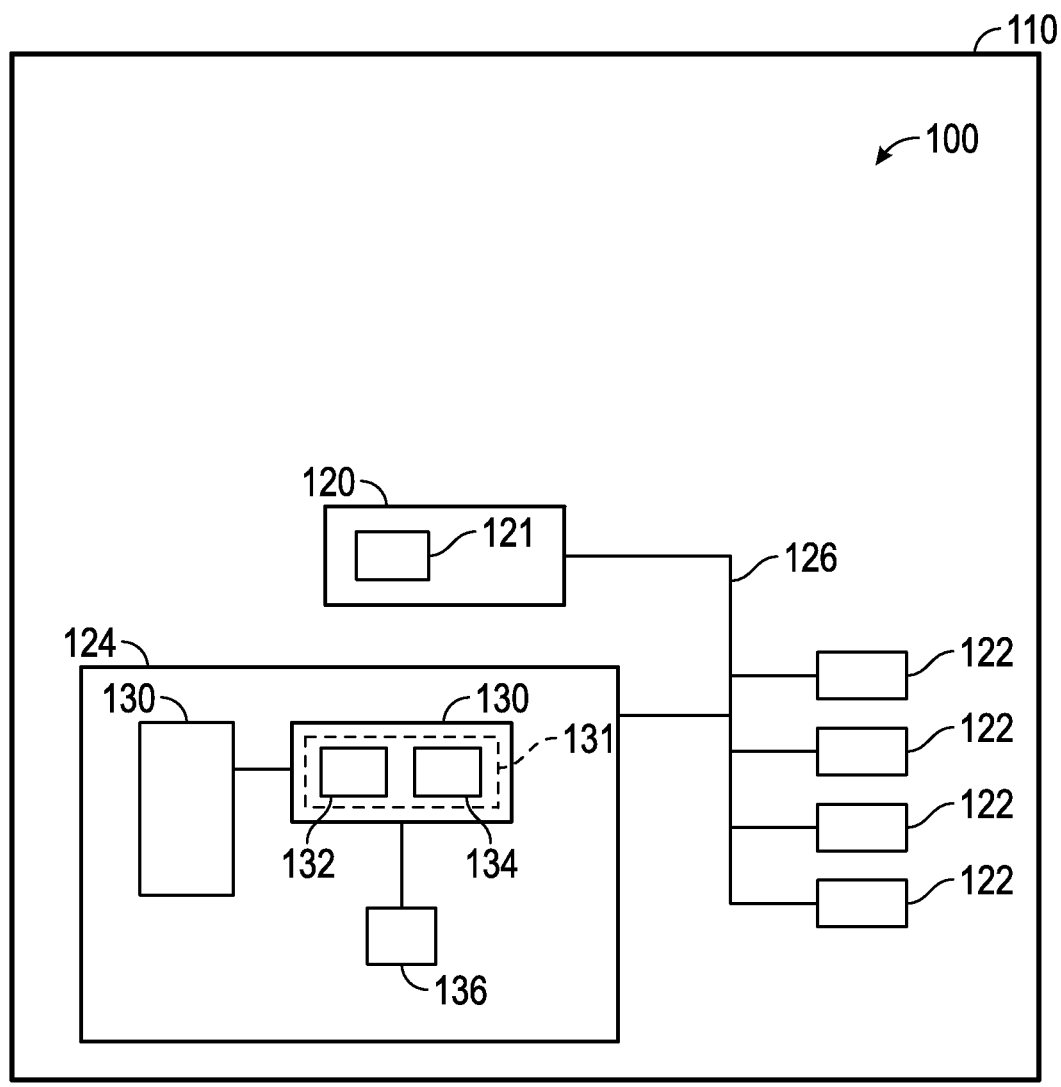
FIG. 1 is a simplified block diagram of an instrumentation system for an aircraft in accordance with some embodiments.

Referring now to FIG. 1, an example of an instrumentation system 100 for an aircraft is illustrated in accordance with some embodiments. In the embodiment provided, the system 100 is located in an airplane 110. In alternative embodiments, the system 100 may be located in other aircraft, land or water vehicles, or fixed-systems other than the airplane 110. For example, the instrumentation system 100 may be located in a helicopter, a boat, a chemical plant, a factory, a power plant, or other types of complex machinery.

The system 100 includes a controller 120, a plurality of aircraft components 122, and a user interface 124. An interconnect 126 electronically couples the controller 120, the aircraft components 122, and the user interface 124 for electronic communication. In the example provided, the interconnect 126 is a bus network, as will be appreciated by those with skill in the art. It should be appreciated that any suitable network topology or physical medium may be utilized for electronic communication in the system 100.

The controller 120 is a hardware device that carries out instructions of a computer program, as is well known to those skilled in the art. The controller 120 may be implemented with a central processing unit ("CPU"), a microprocessor, an application specific integrated circuit ("ASIC"), a microcontroller, and/or other suitable device. The controller 120 includes a memory 121 that stores electronic data and computer programs. For example, the memory 121 may be flash memory, spin-transfer torque random access memory (STT-RAM), magnetic memory, phase-change memory (PCM), dynamic random access memory (DRAM), or other suitable electronic storage medium. Furthermore, the controller 120 may utilize multiple hardware devices as is also appreciated by those skilled in the art.

The aircraft components 122 may be components that directly control flight of the aircraft 110, components that monitor flight status of the aircraft 110, or other components related to operations of the aircraft 110. For example, the aircraft components 122 may include batteries, an auxiliary power unit ("APU"), landing gear, flaps, brakes, electrical loads, engines, a fuel tank, and/or external lights. It should be appreciated that numerous other components 122 may be utilized in operation of the aircraft 122.

The components 122 may send information, data, and/or commands to the controller 120, and vice-versa. For example, a component 122 that is a battery may send an electrical charge status of the battery to the controller 120. The information or data sent by the components may further include position status or operational status, as described below with reference to FIG. 2.

The user interface 124 sends information to, and receives user inputs from, pilots and crew of the airplane 110. The user interface 124 includes displays 130, status indicators 131, and an aural alarm 136. In some alternative embodiments, the aural alarm 136 is omitted. The displays 130 are electronic displays that are electronically coupled with the controller 120 to visually present information and data according to electronic signals generated by the controller 120. For example, the displays 130 may include cathode ray tubes ("CRT"), light-emitting diodes ("LED"), plasma panels, liquid crystal displays ("LCD"), projected images from a Digital Light Processing (DLP) projector, and/or any other suitable electronic display technology. Although described with reference to multiple displays 130, it should be appreciated that the user interface 124 may alternatively include a single display.

In the example provided, the displays 130 include multiple touchscreen LCDs. The touchscreen displays include sensors that detect contact by a user or other object with a screen of the touchscreen displays. The touchscreen displays further communicate the coordinates of the contact to the controller 120, such as by an electronic signal over the interconnect 126. The controller 120 associates the coordinates with a predefined user input and generates appropriate system commands based on the predefined user input. For example, the predefined user input may be associated with an input button displayed at the coordinates on the touchscreen, as will be described below. In some embodiments, the displays 130 include screens on which a cursor is controlled by a trackball, control stick, or other suitable cursor control device.

The component status indicators 131 include a master warning indicator 132 and a master caution indicator 134. The master warning indicator 132 and the master caution indicator 134 electronically communicate with the controller 120 and/or the components 130 to indicate that the attention of the pilot or other crew member is required, as will be appreciated by those with skill in the art. For example, the master warning indicator 132 may illuminate amber when a hydraulic pump has failed. The indicators 132 and 134 may also illuminate when a Caution Advisory System ("CAS") message of an appropriate severity is present, as will be appreciated by those skilled in the art. It should be appreciated that the CAS system may be known by other names depending on the manufacturer of the airplane. The pilot then performs actions based on a checklist in response to the activation of the status indicators 131, as will be described below. It should be appreciated that the component status indicators 131 may include further status indicators associated with individual subsystems or components 122.

In the example provided, the master warning indicator 132 and the master caution indicator 134 are images displayed on dedicated areas of the display 130. As used herein, the term dedicated means that the images do not change location or become hidden behind other images. Accordingly, by touching the screen coordinates corresponding with the displayed master indicator 132 or 134, a user may actuate the master indicator 132 or 134 to command the controller 120 to perform various operations associated with the master indicator 132 or 134. In some embodiments, the master warning indicator 132 and the master caution indicator 134 each have two distinct icons. A first of the icons indicates that no pending checklists are currently awaiting user attention, and a second of the icons indicates that there are pending checklists currently awaiting user attention, as will be described below with reference to FIG. 2.

In some alternative embodiments, the master warning indicator 132 and the master caution indicator 134 are mechanical buttons. The mechanical buttons may be actuated by depressing the buttons to communicate with the controller 120. For example, actuating an illuminated mechanical button master warning indicator 132 may instruct the controller 120 to silence the aural alarm 128.

Figure 2:
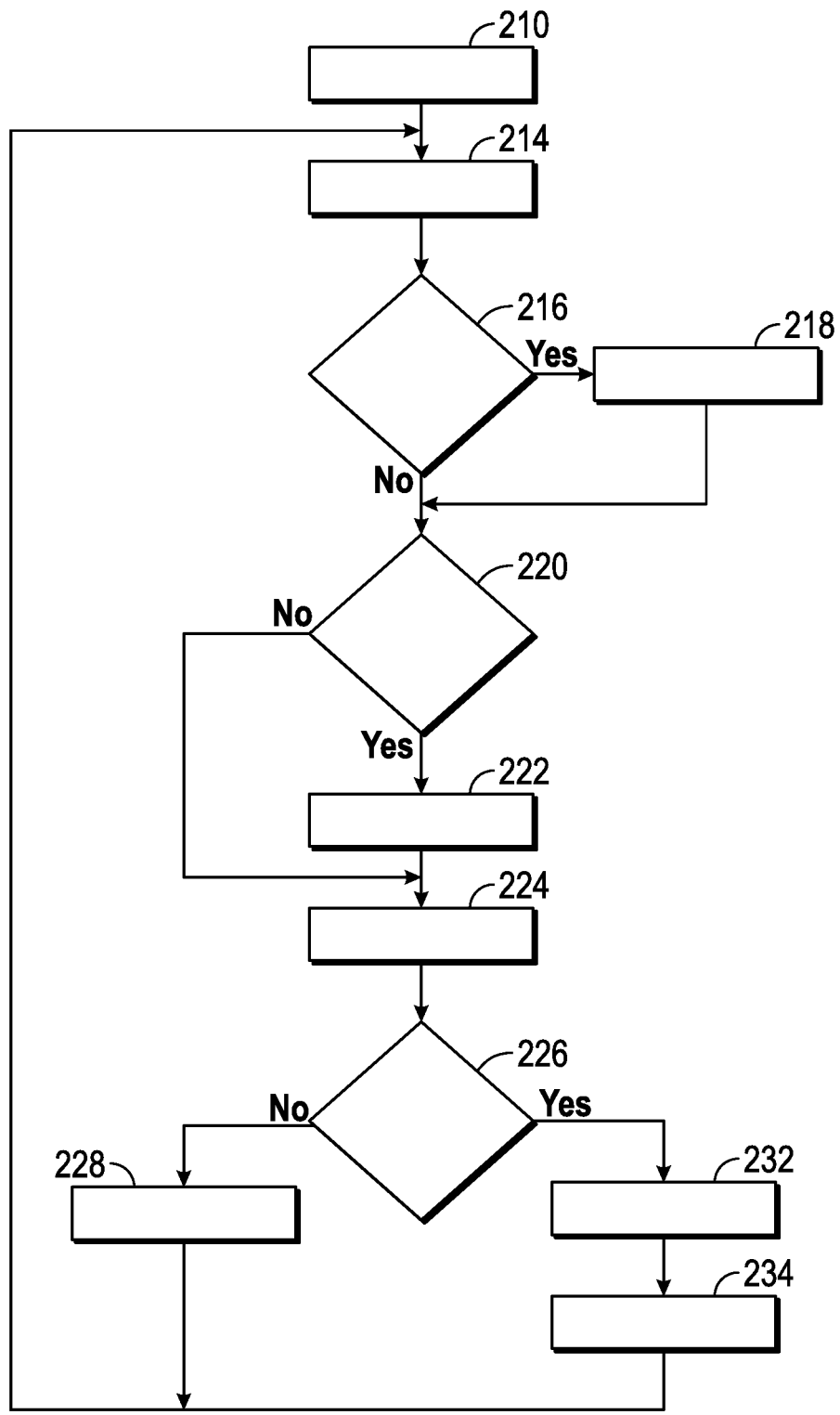
FIG. 2 is a flow diagram of a method of presenting vehicle condition data accordance with some embodiments.

Referring now to FIG. 2, a flow diagram for a method 200 of presenting aircraft condition data is illustrated in accordance with some embodiments. In the example provided, the operations of the method 200 are performed by the system 100 described above. It should be appreciated that the operations of the method 200 may be performed by other systems and other hardware without departing from the scope of the present disclosure.

The controller 120 activates a component status indicator in response to a trigger event in operation 210. The component status indicator may be, for example, the master indicators 132 and 134 described above. In the example provided, activation of the master indicator includes illuminating the mechanical button or touchscreen icon associated with the respective indicator 132 or 134, as well as sounding the aural alarm 136.

The trigger event is any change in status of the components 122 or aircraft 102 that is of sufficient severity to require the immediate or prioritized attention of the pilot or crew of the aircraft, such as those events traditionally associated with activation of a master warning or master caution indicator. For example, the trigger event may be failure of a component 122 or generation of a CAS message communicating a situation of high severity, as will be appreciated by those with skill in the art. The controller 120 may monitor CAS messages to receive the trigger event or may directly detect the operation of the components 122. In some embodiments, the controller 120 is integrated with a controller that generates the CAS messages.

Furthermore, detecting the operation of the components 122 may be performed differently based on each individual component 122 and the type of operation to be detected. In some circumstances, the operation of the components may be defined as whether the component 122 has failed or is inoperable. For example, if the component 122 is a battery, detecting operation of the battery may include detecting whether the battery has a sufficient charge to provide current to various loads of the vehicle 122. In another example, if the component 122 is an engine, detecting operation of the engine may include analyzing one or more signals from the engine to see if the engine is operating properly. Detecting the operation of each individual component 122 may include detecting a lack of communication with the component 122. For example, if the component 122 fails, is destroyed, and/or is otherwise removed, communication between the component 122 and the controller 122 may be interrupted.

In other circumstances, detecting operation of the components 122 may be defined as detecting the state of the component 122. For example, if the component 122 is landing gear, detecting the operation of the landing gear may be determining whether the landing gear is "up", "down", or between states. In another example, if the components 122 are aircraft flaps, detecting the operation of the flaps may be receiving and analyzing a signal which indicates whether the flaps are "set for landing" or "retracted". Furthermore, detecting the state of the component 122 may involve analyzing signals from multiple sensors (not illustrated) for that component 122.

One illustrative example of a trigger event is an overload of an Auxiliary Transformer Rectifier Unit ("Aux TRU") component 122 when an electrical load on the Aux TRU electrical bus exceeds a threshold. In the Aux TRU overload example, the controller 120 may activate the master warning indicator 132 in response to receiving the "Aux TRU Overload" CAS message or in response to directly detecting the overload of the Aux TRU.

In operation 214, the controller 120 receives user input that is associated with the master indicator. The user input may be pressing a mechanical master warning or caution button, touching coordinates on the display 130 that correspond with an electronic display of a master warning or caution button, or other input associated with a user actuating the master indicator. In some embodiments, the user input may include a touchscreen gesture that inputs a unique pattern on the display 130, such as a pilot swiping a finger across a touchscreen in a lateral direction.

The controller 120 determines whether to de-activate the aural alarm 136 in operation 216. For example, the aural alarm 136 may already be de-activated when the operation 214 has been performed more than once. In another example, the trigger event may be of sufficient severity that the aural alarm 136 does not turn off until the conditions that caused the trigger event are appropriately tended to. When the aural alarm is to be de-activated, the controller 120 de-activates the aural alarm in operation 218.

When the aural alarm is not to be de-activated, or after the aural alarm has been de-activated in operation 218, the controller determines whether the user input is an information display request in operation 220. An information display request is a specific type of user input that is configured to command the controller 120 to display information related to the trigger event. The user input is any type of actuation of buttons, input devices, a touchscreen, or other input interface that commands the controller 120 to display the information. For example, a first user input may be a single actuation or touch of a master indicator icon on the display 130 in a span of a predetermined time, such as one actuation within a span of several seconds. A second user input may be a double actuation or prolonged actuation where the master indicator icon is actuated twice within a predetermined time span of several seconds or is actuated continuously for a period of time, such as one second. The first user input may be associated with simply silencing the alarm, while the second user input may be an information display request. It should be appreciated that any suitable user input may be selected as the information display request, such as unique gestures or patterns of finger movement across a touch screen. In some implementations, the user input associated with the master indicator may be re-configured by the user or airplane manufacturer to be an information display request.

When the user input is not an information display request, the controller 120 proceeds to operation 224. When the user input is an information display request, the controller 120 displays the information associated with the trigger event in a dedicated area for the information on the display 130. The information may include checklists, synoptics, or graphics that are stored in the memory 121. Checklists present various tasks for the pilot or crew to perform in order to eliminate or reduce effects of the trigger event. Synoptics and graphics present layouts and system status in schematic form.

Figure 3:
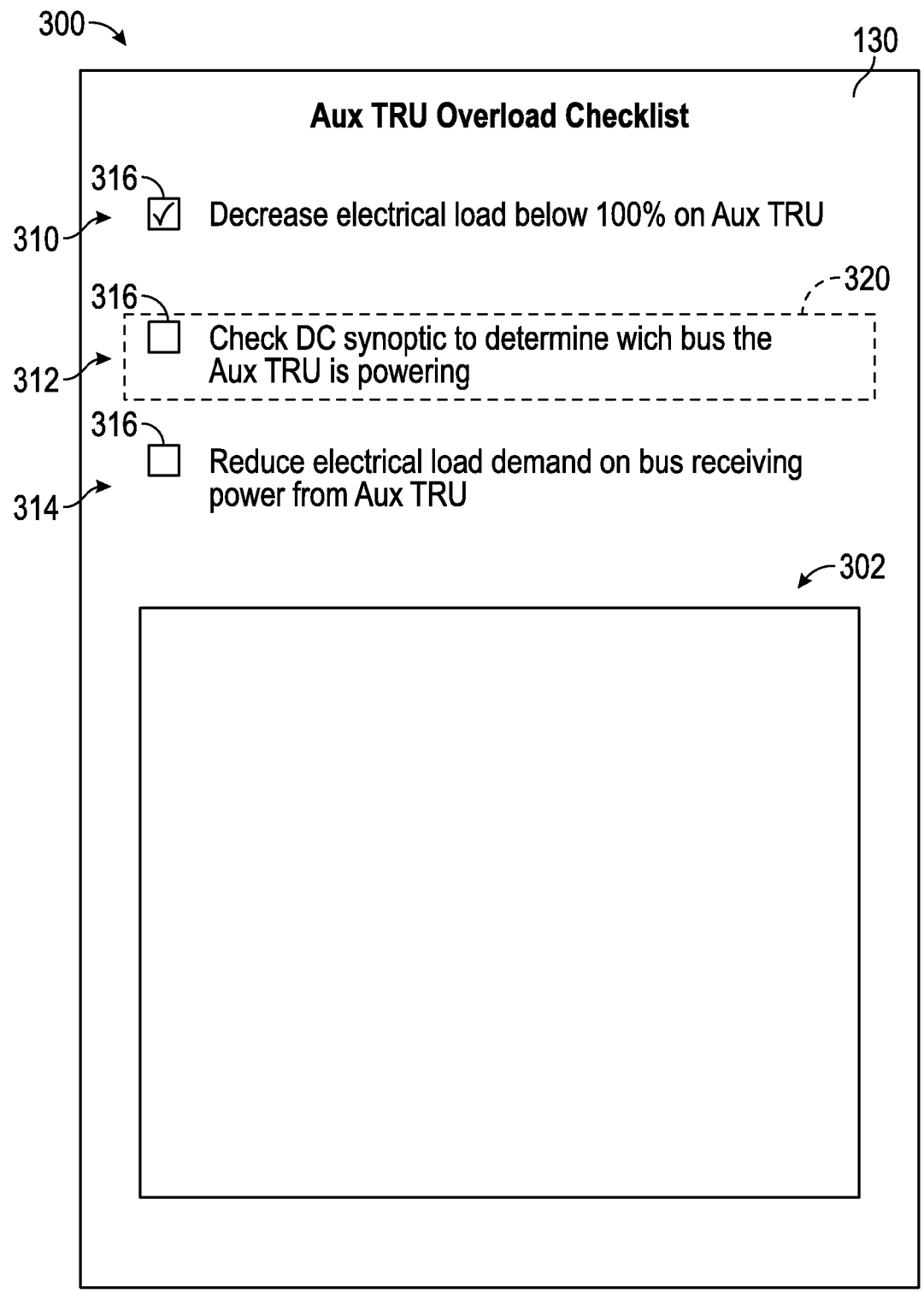
FIG. 3. is a simplified block diagram of a checklist and synoptics for an aircraft in accordance with some embodiments.

Synoptics are stylized block diagrams of aircraft systems that typically have stylized graphics that put the block diagram into the context of the airplane. For example, when the trigger event is an Aux TRU Overload, the controller 120 may display the checklist 300 and the synoptic 302 as illustrated in FIG. 3 in response to the information display request. In some embodiments, when more than one checklist is pending the controller 120 may display the highest priority checklist first, with subsequent user inputs rotating through the pending checklists. In some alternative embodiments, the controller 120 may merge all pending checklists or may merge relevant or high priority checklists for display.

As can be seen from FIG. 3, the checklist 300 includes a first task 310, a second task 312, and a third task 314. A checkbox or other completion indicator 316 is associated with each task to track progression through the checklist 300. In the example provided, the synoptic 302 is a "DC synoptic" electrical layout schematic associated with the second task 312. The DC synoptic graphically illustrates the relation between the Aux TRU and other electrical busses to help identify which bus is receiving power from the Aux TRU in task 312. Once the bus powered by the Aux TRU is identified, the electrical load demand on the bus powered by the Aux TRU may be reduced according to task 314. It should be appreciated that multiple synoptics may be displayed or a designated area for displaying one synoptic at a time may be utilized without departing from the scope of the present disclosure.

The controller 120 updates the displayed information based on user input associated with the trigger event in operation 224. For example, updates may include marking the completion indicators 316 upon user contact with the screen at the coordinates associated with a task displayed on the checklist 300, such as the first task 310 of FIG. 3. The updates may further include displaying further checklists, synoptics, or graphics associated with the trigger event. In embodiments where multiple synoptics 302 are associated with the trigger event, the updates may include changing which synoptic is displayed. For example, where a different synoptic is initially displayed, the synoptic 302 may be displayed in response to a user touching the display 130 inside an area 320 that surrounds the displayed task 312 of the checklist 300.

In other embodiments, the user may select the area 320 with a trackball or other input device to command the controller 120 to display the DC synoptic. The controller 120 may then automatically check the completion indicator 316 associated with the task 312. In other embodiments, the user input associated with the trigger event may be detected based on user interaction with the components 122. For example, the controller 122 may mark the completion indicator 316 for a "turn on battery" task when the controller 122 detects that the battery has been turned on.

The controller 120 determines whether the trigger event is cleared in operation 226 for updating an icon associated with the component status indicator. For example, the trigger event may be cleared when all checklists associated with the trigger event have been completed. When the trigger event is cleared, the controller 120 displays an icon that indicates there are no pending trigger event checklists in operation 228. For example, the icon may be a normal master indicator icon, a grayed out checklist icon, absence of indications, or any other suitable icon associated with the absence of pending trigger event checklists.

When the trigger events are not cleared, the controller 120 displays a trigger event pending checklist icon in operation 234. For example, the trigger event pending checklist icon may be a master indicator icon with a caution symbol, warning symbol, checklist, exclamation mark, or other symbol overlaid overtop the master indicator icon. In other examples, the pending checklist icon may be an illuminated checklist icon or other symbol displayed in an area separate from the master indicator. In some embodiments, touching the pending checklist icon on a touchscreen is an information display request as described with respect to operation 222 in order to display the pending checklist or a list of checklists. It should be appreciated that operations 226, 228, 232, and 234 may be performed in a different order within the method 200. For example, the pending checklist icon may be displayed immediately following operation 210 when the indicator is activated.

The embodiments described herein have several beneficial features. For example, by pressing a master warning or master caution indicator, a pilot is able to silence an aural alarm and display the associated information, such as checklist(s), synoptic, and other graphics, or references to same. The information may be displayed in response to the same user input used to silence the alarm or in response to a separate user input. For example, actuating a button (mechanical or touchscreen) twice could display the appropriate checklists and other displays, or a drag gesture on a touchscreen could display a checklist.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of presenting aircraft information, the method comprising:
    activating, with a controller, a master indicator in response to a trigger event associated with operation of the aircraft, wherein activating the master indicator is activating a master warning or activating a master caution;
    receiving, at the controller, a user input associated with the master indicator; and
    displaying, on a display, information associated with the trigger event in response to receiving the user input associated with the master indicator.

2. The method of claim 1, wherein displaying information associated with the trigger event includes displaying a checklist associated with the trigger event in a dedicated area of the display.

3. The method of claim 1, wherein displaying information associated with the trigger event includes displaying synoptics or graphics associated with the trigger event.

4. The method of claim 1, wherein activating a master indicator includes activating an aural alarm, and wherein the method further includes de-activating the aural alarm in response to the user input.

5. The method of claim 4, wherein the user input associated with the master indicator includes a first user input and a second user input, and wherein de-activating the aural alarm is in response to receiving the first user input, and wherein displaying the information associated with the trigger event is in response to receiving the second user input.

6. The method of claim 5, wherein the first user input is a single actuation of the master indicator.

7. The method of claim 5, wherein the second user input is a double actuation or a prolonged actuation of the master indicator.

8. The method of claim 5, wherein the second user input is an actuation of a pending checklist icon displayed in a dedicated portion of a display.

9. The method of claim 5, wherein the second user input is a unique gesture on a touchscreen.

10. The method of claim 1, wherein displaying the information includes displaying a checklist and a synoptic or graphic simultaneously.

11. The method of claim 1, further comprising displaying a pending checklist icon in a dedicated area of a display when a checklist associated with the trigger event has not been completed.

12. The method of claim 11, further comprising displaying a no pending checklist icon in the dedicated area of the display when the checklist associated with the trigger event has been completed.

13. The method of claim 1, wherein activating the master indicator includes illuminating an icon of a master warning indicator or a master caution indicator on an electronic display of the aircraft.

14. An instrumentation system for an aircraft, the instrumentation system comprising:
- a plurality of aircraft components that are associated with operating the aircraft;
- a master indicator for indicating the status of any aircraft component of the plurality of aircraft components, wherein the master indicator is a master warning indicator or a master caution indicator;
- a controller electronically coupled with the plurality of aircraft components and the master indicator, the controller configured for:
  - activating the master indicator in response to a trigger event associated with any aircraft component of the plurality of aircraft components;
  - receiving a user input associated with the master indicator; and
  - displaying information associated with the trigger event in response to receiving the user input associated with the master indicator.

15. The instrumentation system of claim 14, wherein the controller is further configured for displaying a checklist and synoptics associated with the trigger event.

16. The instrumentation system of claim 14, wherein the user input associated with the master indicator includes a first user input and a second user input, and wherein the controller is configured for de-activating the aural alarm in response to receiving the first user input, and wherein the controller is configured for displaying the checklist based on the trigger event in response to receiving the second user input.

17. The instrumentation system of claim 16, wherein the first user input is a single actuation of the master indicator.

18. The instrumentation system of claim 16, wherein the second user input is a double actuation or a prolonged actuation of the master indicator.

19. The instrumentation system of claim 15, further comprising an electronic display, and wherein the second user input is an actuation of a pending checklist icon on the electronic display.

20. The instrumentation system of claim 14, wherein the master indicator is displayed in a dedicated location on an electronic display of an aircraft.

* * * * *